United States Patent
Ishijima

(10) Patent No.: US 7,149,077 B2
(45) Date of Patent: Dec. 12, 2006

(54) SOLID ELECTROLYTIC CAPACITOR WITH FACE-DOWN TERMINALS, MANUFACTURING METHOD OF THE SAME, AND LEAD FRAME FOR USE THEREIN

(75) Inventor: Masami Ishijima, Tokyo (JP)

(73) Assignees: NEC TOKIN Corporation, Sendai (JP); NEC TOKIN Toyama, Ltd., Toyama (JP)

( * ) Notice: Subject to any disclaimer, the term of this patent is extended or adjusted under 35 U.S.C. 154(b) by 0 days.

(21) Appl. No.: 11/274,400

(22) Filed: Nov. 15, 2005

(65) Prior Publication Data

US 2006/0126273 A1 Jun. 15, 2006

(30) Foreign Application Priority Data

Dec. 10, 2004 (JP) ............................. 2004-358094
Dec. 10, 2004 (JP) ............................. 2004-358095
Sep. 2, 2005 (JP) ............................. 2005-255086

(51) Int. Cl.
H01G 4/228 (2006.01)
H01G 9/10 (2006.01)

(52) U.S. Cl. ...................................... 361/540; 361/538
(58) Field of Classification Search ........ 361/532–533, 361/540, 523, 528, 529, 535–539
See application file for complete search history.

(56) References Cited

U.S. PATENT DOCUMENTS 6,808,541 B1 * 10/2004 Maeda ....................... 29/25.03
6,975,503 B1 * 12/2005 Abe et al. ................... 361/533
2004/0125542 A1 * 7/2004 Fujii et al. .................. 361/523

FOREIGN PATENT DOCUMENTS

JP 2004-228424 A 8/2004
JP 2005-101418 A 4/2005
JP 2005-197457 A 7/2005

* cited by examiner

Primary Examiner—Eric W. Thomas
(74) Attorney, Agent, or Firm—Frishauf, Holtz, Goodman & Chick, P.C.

(57) ABSTRACT

A face-down terminal solid electrolytic capacitor with the increased strength between electrode terminals and a casing resin is provided. The face-down terminal solid electrolytic capacitor has a structure where a mold structure in which a lead frame and capacitor elements fixed to the lead frame are overmolded with a casing resin is cut along cutting planes respectively passing through an anode terminal forming portion and a cathode terminal forming portion of the lead frame so that end surfaces of an anode terminal and a cathode terminal are exposed. In the lead frame, the anode terminal forming portion 21 and the cathode terminal forming portion 22 are provided so as to face each other. The anode terminal forming portion has a concave portion 21j on the board mount side and a convex portion 21t on the opposite side, which are formed by deforming part of the anode terminal forming portion in a direction perpendicular to a board mount surface. The concave portion is applied with plating. The convex portion has a flat portion parallel to the board mount surface and serving as a welding margin, an inclined portion 21b continuous with the flat portion and inclined so as to approach the board mount surface as going away from the flat portion, and projecting portions 21a on lateral sides of the convex portion. By cutting along a cutting plane 23a, the anode terminal is formed so as to have a cut end surface, a fillet surface 24a, and a board mount surface as exposed surfaces.

29 Claims, 12 Drawing Sheets

SOLID ELECTROLYTIC CAPACITOR WITH FACE-DOWN TERMINALS, MANUFACTURING METHOD OF THE SAME, AND LEAD FRAME FOR USE THEREIN

This application claims priority to prior Japanese Patent Applications Nos. 2004-358094, 2004-358095 and 2005-255086, the disclosures of which including specification, drawings and claims are incorporated herein by reference in their entieties.

BACKGROUND OF THE INVENTION

This invention relates to a solid electrolytic capacitor and, in particular, relates to a solid electrolytic capacitor with face-down terminals having electrodes directly drawn out to its board mount side from the bottom of a capacitor element, a method of manufacturing such a face-down terminal solid electrolytic capacitor, and a lead frame for use therein.

Solid electrolytic capacitors using tantalum, niobium, or the like as a valve-action metal are small in size, large in capacitance, and excellent in frequency characteristic and have thus been widely used for decoupling in power circuits of CPUs and so on. Following the recent development of portable electronic devices, particularly the advanced functionality thereof, face-down terminal solid electrolytic capacitors of the type where electrodes are directly drawn out to the board mount side have been commercialized.

Japanese Unexamined Patent Application Publication (JP-A) No. 2004-228424 discloses a face-down terminal solid electrolytic capacitor of this type. According to this publication, it is necessary to apply plating to fillet surfaces, recessed from end surfaces of electrode terminals, after cutting of the terminals and therefore there is a problem in terms of reducing the number of processes.

As techniques for solving this problem, the applicant of this application has filed Japanese Patent Application No. 2003-334961 (Japanese Unexamined Patent Application Publication (JP-A) No. 2005-101418) and Japanese Patent Application No. 2004-002180 (Japanese Unexamined Patent Application Publication (JP-A) No. 2005-197457). Although these techniques can solve the foregoing problem of the number of processes relating to the plating, further improvements are needed in other aspects.

For example, there is a problem that electrode terminals come off a casing resin while manufacturing a face-down terminal solid electrolytic capacitor or mounting the product onto a board. This is because it is considered that anchoring forces between the electrode terminals and the casing resin are small and thus the anchor effect therebetween is insufficient. Another problem is that when an anode lead of a capacitor element is welded to a lead frame and then this composite is overmolded with a casing resin, and finally a face-down terminal solid electrolytic capacitor is cut out therefrom, there is no securely welded portion between the anode lead of the capacitor element and the anode terminal in the capacitor so that connection failure may be caused, thereby degrading reliability of the capacitor. This is because it is considered that since the welding margin of the lead frame extends over the anode lead in a longitudinal direction thereof, secure welding cannot be achieved at a precise position.

This situation will be further explained with reference to the drawings. FIGS. 10A to 10C shows a solid electrolytic capacitor with face-down terminals described in JP-A-2005-197457, wherein FIG. 10A is a side view of the capacitor on an anode side thereof, FIG. 10B is a front view of the capacitor where a casing resin on the right side of a line A—A in FIG. 10A is removed, and FIG. 10C is a side view of the capacitor on a cathode side thereof. In FIGS. 10A to 10C, 11 denotes a capacitor element, 12 an anode lead, 73 a face-down anode terminal, 74 a face-down cathode terminal, 76a an anode-side fillet surface having been subjected to plating, 76b a cathode-side fillet surface having been subjected to plating, 79 a generally [-shaped anode terminal cut surface appearing on one side of the capacitor, 17 an insulating resin, 78 a cathode terminal cut surface appearing on the other side of the capacitor, 19 an insulating casing resin, and 20 a conductive adhesive. In FIG. 10B, the fillet surfaces 76a and 76b are formed at positions slightly recessed from the anode terminal cut surface 79 and the cathode terminal cut surface 78, respectively.

Manufacturing processes of this solid electrolytic capacitor with face-down terminals will be described with reference to FIG. 11. FIG. 11 is a flow diagram showing the manufacturing processes of the capacitor shown in FIGS. 10A to 10C. S61 is a process of producing a lead frame, S63 is a process of applying plating to the lead frame, S64 is a process of fixedly joining capacitor elements to the lead frame, S65 is a process of overmolding with a casing resin, and S66 is a process of cutting the casing resin and the lead frame.

FIG. 12 is a front view showing the state where the casing resin on the front side of the plane passing through a center axis of the capacitor and perpendicular to the bottom surface of the lead frame is removed after joining the capacitor element to the lead frame and overmolding them with the casing resin in the foregoing processes shown in FIG. 11. In FIG. 12, 81 denotes an anode terminal forming portion of the lead frame, 82 a cathode terminal forming portion of the lead frame, 23a and 23b cutting planes, respectively, and 84a and 84b recessed portions after cutting to serve as the fillet surfaces, respectively. By providing the plated recessed portions in this manner, the process of plating after cutting becomes unnecessary.

According to the technique of JP-A-2005-101418 or JP-A-2005-197457, the process of plating after cutting is not required so that the productivity is excellent. However, the following problems arise in the process of cutting out the capacitor as a product from the lead frame or thereafter. Specifically, (1) the electrode terminals may come off the casing resin after the cutting due to friction at the time of the cutting and (2) since the anchor effect is insufficient in the casing resin, the electrode terminals may come off when mounting the product onto a board. These problems become significant particularly for the cathode terminal of which the anchor effect with the casing resin is small.

Further, when a flat surface of the anode terminal provided for welding of the anode lead is uniformly planar over the anode lead in a longitudinal direction thereof, it is difficult to accurately control a position of welding with the anode lead. Therefore, the reliability of connection largely changes depending on a position where the anode lead is welded to the flat surface of the anode terminal.

SUMMARY OF THE INVENTION

It is an object of this invention to provide a solid electrolytic capacitor with face-down terminals of which manufacturing processes are not complicated and in which the fixing strength between electrode terminals and a casing resin is increased, and further provide a method of manufacturing such a capacitor, and a lead frame for use therein.

According to the first aspect of the present invention, there is provided a face-down-terminal solid electrolytic capacitor including a capacitor element having a dielectric, an electrolyte, and a cathode layer formed in the order named on a surface of a porous sintered body made of a valve-action metal and having an anode lead drawn out therefrom, an anode terminal having one end connected to the anode lead and the other end serving as an external connection terminal, a cathode terminal disposed so as to face the anode terminal and having one end electrically connected to the cathode layer of the capacitor element and the other end serving as an external connection terminal, and a casing resin covering the capacitor element, causing the anode terminal to have, as exposed surfaces, a mount surface onto a board and a first external end surface substantially perpendicular to the mount surface, and causing the cathode terminal to have, as exposed surfaces, a mount surface onto the board and a second external end surface substantially perpendicular to the mount surface. The anode terminal comprises an exposed surface recessed from the first external end surface and applied with plating, a stair-shaped portion formed, on a side, where the capacitor element is located, opposite to a side of the first external end surface, with an upper-stair portion connected to the anode lead and with a lower-stair portion having the mount surface as a bottom surface thereof, and an engaging portion formed at a side wall of the stair-shaped portion for engagement with the casing resin.

The engaging portion of the anode terminal may be a projecting portion or a cut-out portion.

The projecting portion or the cut-out portion of the anode terminal may be formed in the vicinity of the upper-stair portion of the stair-shaped portion.

The recessed surface of the anode terminal may comprise a surface substantially parallel to the first external end surface.

The first external end surface of the anode terminal has a generally [-shape.

The stair-shaped portion of the anode terminal is preferred to be formed by a drawing process or a crushing process.

Preferably, the anode terminal has an inclined portion continuous with the upper-stair portion of the stair-shaped portion and approaching the mount surface as going away from the upper-stair portion.

A difference in level between the upper-stair portion and the lower-stair portion of the anode terminal is preferred to be greater than a minimum distance between the cathode layer, on a mount surface side, of the capacitor element and an outer periphery of the anode lead.

The cathode terminal comprises an exposed surface recessed from the second external end surface and applied with plating, a stair-shaped portion formed with an upper-stair portion on a side, where the capacitor element is located, opposite to a side of the second external end surface and with a lower-stair portion having the mount surface as a bottom surface thereof, and an engaging portion formed at a side wall of the stair-shaped portion for engagement with the casing resin.

According to the second aspect of the invention, a lead frame for use in face-down terminal solid electrolytic capacitor terminal formation is provided. The lead frame has an anode terminal forming portion and a cathode terminal forming portion disposed so as to face each other, wherein the anode terminal forming portion comprises a stair-shaped portion having an upper-stair portion and a lower-stair portion, a hollow portion formed in the stair-shaped portion, having an inner wall substantially perpendicular to a bottom surface adapted to serve as a mount surface, extending toward the upper-stair portion, and applied with plating, and a projecting portion or a cut-out portion formed at a side wall of the stair-shaped portion in the vicinity of the upper-stair portion.

The cathode terminal forming portion comprises a stair-shaped portion having an upper-stair portion and a lower-stair portion, a hollow portion formed in the stair-shaped portion, having an inner wall substantially perpendicular to a bottom surface adapted to serve as a mount surface, extending toward the upper-stair portion, and applied with plating, and a projecting portion or a cut-out portion formed at a side wall of the staircase portion in the vicinity of the upper-stair portion.

According to the third aspect of the invention, there is provided a face-down terminal solid electrolytic capacitor manufacturing method comprising the steps of: placing, on the lead frame, a capacitor element having a dielectric, an electrolyte, and a cathode layer formed in the order named on a surface of a porous sintered body made of a valve-action metal and having an anode lead drawn out therefrom, and joining the anode lead to the upper-stair portion of the anode terminal forming portion; overmolding the capacitor element and the lead frame with a casing resin; cutting the casing resin, the anode terminal forming portion, and the anode lead so as to cross the hollow portion substantially perpendicularly to the bottom surface of the anode terminal forming portion to thereby form a first end surface adapted to serve as part of an external surface of the face-down terminal solid electrolytic capacitor and to thereby expose part of a wall surface of the hollow portion recessed from the first end surface; and cutting the casing resin and the cathode terminal forming portion so as to cross the hollow portion substantially perpendicularly to the bottom surface of the cathode terminal forming portion to thereby form a second end surface adapted to serve as part of the external surface of the face-down terminal solid electrolytic capacitor and to thereby expose part of a wall surface of the hollow portion recessed from the second end surface.

In accordance with a specific feature of the inventuion, there is provided a lead frame for terminal formation used in manufacturing a face-down terminal solid electrolytic capacitor including a capacitor element having a dielectric, an electrolyte, and a cathode layer formed in the order named on a surface of a porous sintered body made of a valve-action metal and having an anode lead drawn out therefrom, an anode terminal having one end connected to the anode lead and the other end serving as an external connection terminal, a cathode terminal having one end connected to the cathode layer of the capacitor element and the other end serving as an external connection terminal, and an insulating casing resin covering the capacitor element and causing each of the anode terminal and the cathode terminal to have, as exposed surfaces, a mount surface onto a board and an outer surface substantially perpendicular to the mount surface. An anode terminal forming portion to serve as the anode terminal and a cathode terminal forming portion to serve as the cathode terminal are provided so as to face each other, the anode terminal forming portion has a concave-convex portion formed by deforming part of the anode terminal forming portion in a direction perpendicular to the mount surface, the concave-convex portion serving as a concave portion on a mount surface side and as a convex portion on a side opposite to the mount surface side, the concave portion is applied with plating, and the convex portion comprises a flat portion parallel to the mount surface and adapted to serve as a welding margin and an inclined portion continuous with the flat portion and inclined so as to approach the mount surface as going away from the flat portion.

The concave-convex portion is formed by a drawing process.

In accordance with a more specific feature of the invention, a face-down terminal solid electrolytic capacitor manufacturing method comprises the steps of: joining the capacitor element to the lead frame; overmolding the capacitor element and the lead frame with the casing resin; and cutting the lead frame, the anode lead, and the casing resin along one of plated surfaces of the concave portion while leaving the one of plated surfaces, thereby forming an outer surface adapted to serve as a side surface of a product.

According to a specific aspect of the invention, a face-down terminal solid electrolytic capacitor includes a capacitor element having a dielectric, an electrolyte, and a cathode layer formed in the order named on a surface of a porous sintered body made of a valve-action metal and having an anode lead drawn out therefrom, an anode terminal having one end connected to the anode lead and the other end serving as an external connection terminal, a cathode terminal having one end connected to the cathode layer of the capacitor element and the other end serving as an external connection terminal, and an insulating casing resin covering the capacitor element and causing each of the anode terminal and the cathode terminal to have, as exposed surfaces, a mount surface onto a board and an outer surface substantially perpendicular to the mount surface. The anode terminal is exposed at part of each of, among outer surfaces of a product, the mount surface and a first side surface on an anode lead side and has an exposed surface that is continuous across a boundary between the mount surface and the first side surface, the anode terminal has a two-stair shape formed by a drawing process or a crushing process in the casing resin, a difference in level of the two-stair shape is greater than a minimum distance between the cathode layer on a mount surface side and an outer periphery of the anode lead, the first side surface comprises a cut surface and a plated surface formed at part of the anode terminal, a cut-surface shape of the anode terminal at the cut surface is a generally [-shape, and the anode terminal has a projecting portion or a cut-out portion extending in a direction parallel to the mount surface and located at a position away from the mount surface.

The cathode terminal is exposed at part of each of, among the outer surfaces of the product, the mount surface and a second side surface on a side opposite to the anode lead side and has an exposed surface that is continuous across a boundary between the mount surface and the second side surface, the cathode terminal has a two-stair shape formed by a drawing process or a crushing process in the casing resin, a difference in level of the two-stair shape is greater than the minimum distance between the cathode layer on the mount surface side and the outer periphery of the anode lead, the second side surface comprises a cut surface and a plated surface formed at part of the cathode terminal, a cut-surface shape of the cathode terminal at the cut surface is a generally [-shape, and the cathode terminal has a projecting portion or a cut-out portion extending in a direction parallel to the mount surface and located at a position away from the mount surface.

According to this invention, the plating process after cutting can be omitted so that the productivity is excellent and, further, the following effects can be obtained. By providing the terminal shape having a projecting portion or a cut-out portion adapted to serve as an engaging member with respect to a casing resin, (1) electrode terminals do not come off the casing resin even by a friction force applied at the time of cutting in the manufacturing process and (2) since the anchor effect with the casing resin is obtained when mounting a product onto a board, the electrode terminals are preventing from coming off the casing resin. These effects are significant particularly for the cathode terminal of which a bonding force with the casing resin is small.

Further, in this invention, when it is configured not to make horizontal the whole surface of a connection upper surface of a lead frame where an anode lead of a capacitor element is welded, but it is configured to provide a horizontal flat portion which is short in an extending direction of the anode lead and long in a direction perpendicular to the extending direction and an inclined portion applied with inclination processing, it is possible to avoid contact between the anode lead and the anode terminal outside the welding range so that (1) it is possible to improve the welding position accuracy between the anode lead of the capacitor element and the lead frame and (2) the welding margin can be ensured and thus the reliability of connection can be enhanced.

BRIEF DESCRIPTION OF THE DRAWINGS

FIGS. 1A to 1C show a face-down terminal solid electrolytic capacitor of this invention, wherein FIG. 1A is a side view of the capacitor on an anode side thereof, FIG. 1B is a front view of the capacitor where part of a casing resin is removed, and FIG. 1C is a side view of the capacitor on a cathode side thereof;

FIGS. 2A and 2B show a lead frame according to this invention, wherein FIG. 2A is a plan view of the lead frame and FIG. 2B is a front view of a pair of facing anode and cathode terminal forming portions as seen from a direction C—C in FIG. 2A;

FIGS. 3A to 3E show the anode terminal forming portion used in this invention, wherein FIG. 3A is a plan view, FIG. 3B is a front view, FIG. 3C is a side view, FIG. 3D is a sectional view, and FIG. 3E is a perspective view;

FIGS. 4A to 4D show the cathode terminal forming portion used in this invention, wherein FIG. 4A is a plan view, FIG. 4B is a front view, FIG. 4C is a side view, and FIG. 4D is a sectional view;

FIGS. 10A to 10C show a solid electrolytic capacitor with face-down terminals described in JP-A-2005-197457, wherein FIG. 10A is a side view of the capacitor on an anode side thereof, FIG. 10B is a front view of the capacitor where part of a casing resin is removed, and FIG. 10C is a side view of the capacitor on a cathode side thereof;

DESCRIPTION OF THE PREFERRED EMBODIMENTS

Figure 1A:
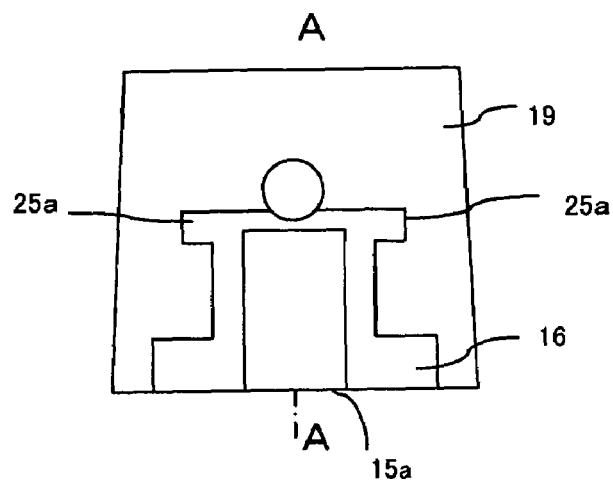
Figure 1B:
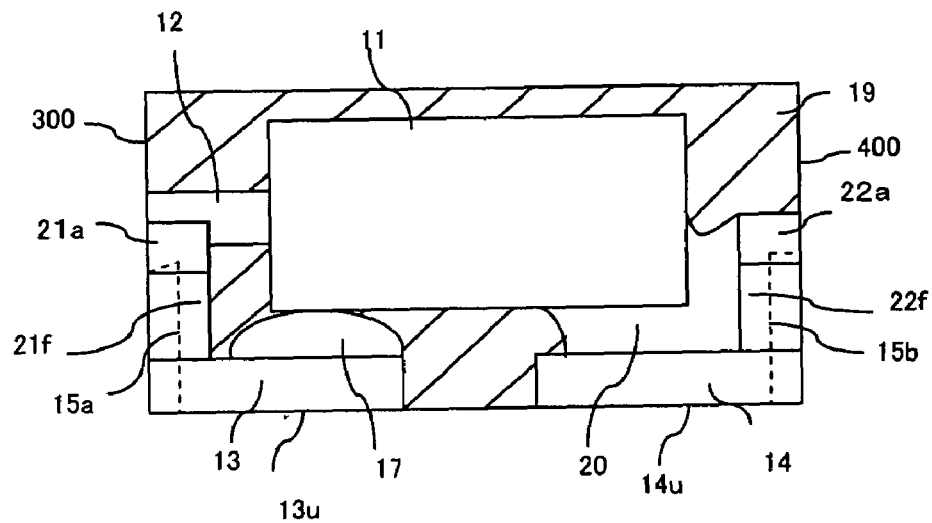
Figure 1C:
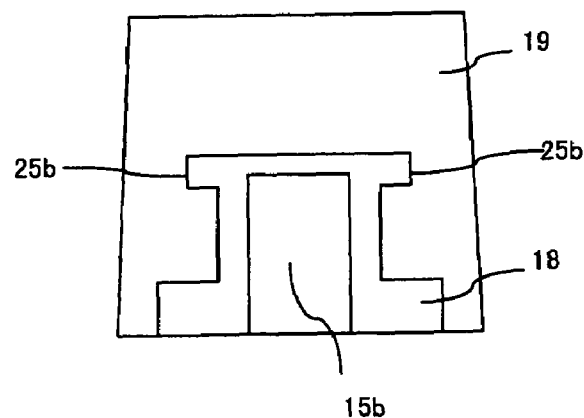

Now, an embodiment of this invention will be described with reference to the drawings. Prior to describing a face-down terminal solid electrolytic capacitor manufacturing method according to this invention and a lead frame for use therein, description will first be made about a structure of a solid electrolytic capacitor with face-down terminals according to this invention with reference to FIGS. 1A to 1C. FIG. 1A is a side view of the capacitor on an anode side thereof. FIG. 1B is a front view of the state where a casing resin on the right side of a plane A—A perpendicular to the bottom surface of the capacitor shown in FIG. 1A is removed, wherein the exposed casing resin is shown by hatching. FIG. 1C is a side view of the capacitor on a cathode side thereof. In FIGS. 1A to 1C, 11 denotes a capacitor element, 12 an anode lead, 13 a face-down anode terminal, 14 a face-down cathode terminal, 15a an anode-side fillet surface having been subjected to plating, 15b a cathode-side fillet surface having been subjected to plating, 16 a generally [-shaped anode terminal cut surface, 17 an insulating resin, 18 a cathode terminal cut surface, 19 a casing resin, and 20 a conductive adhesive. Further, 25a and 25b are projecting portions of the terminals for obtaining the anchor effect with the casing resin.

Figure 2A:
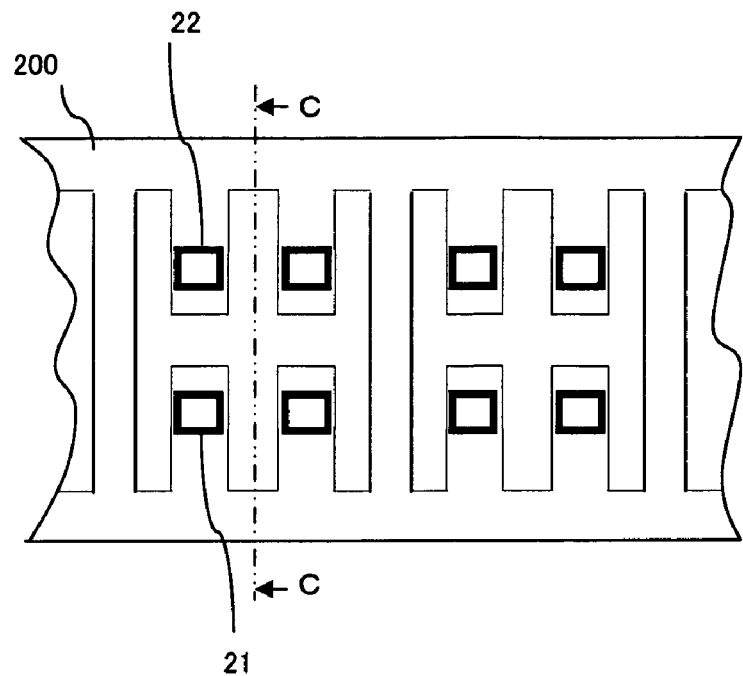
Figure 2B:
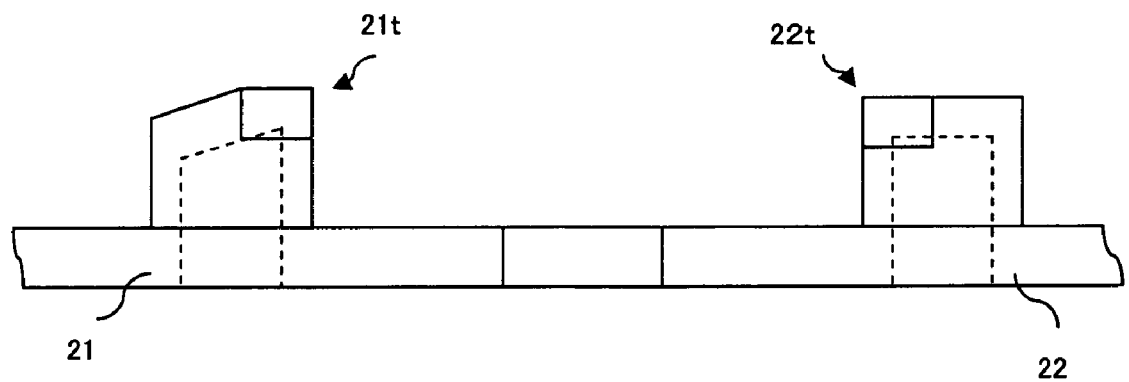
Figure 3A:
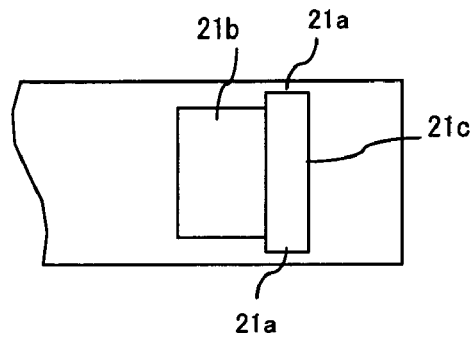
Figure 3B:
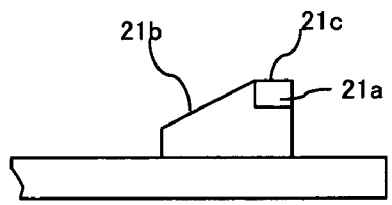
Figure 3C:
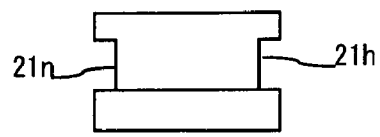
Figure 3D:
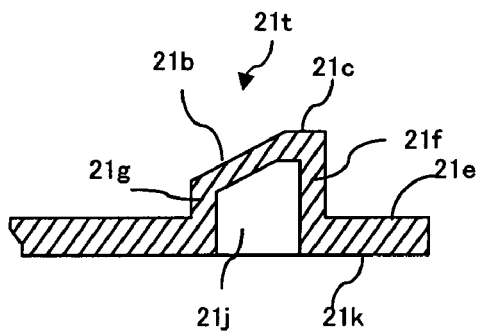
Figure 3E:
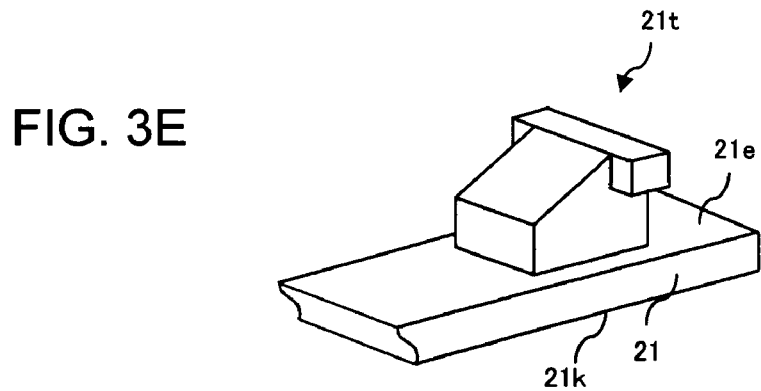
Figure 4A:
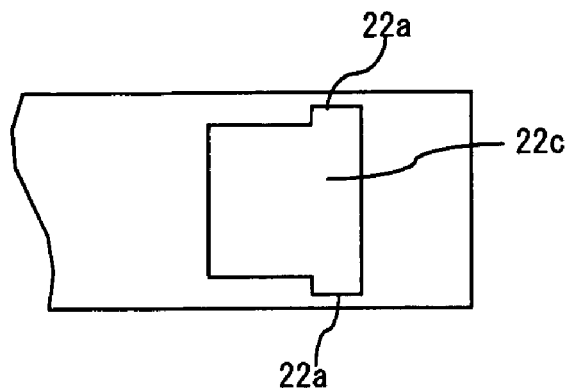
Figure 4B:
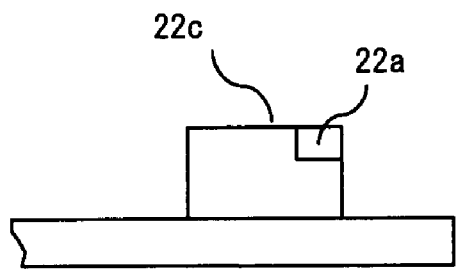
Figure 4C:
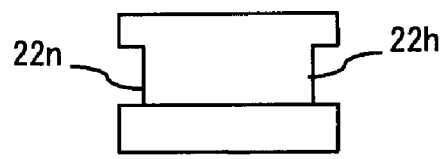
Figure 4D:
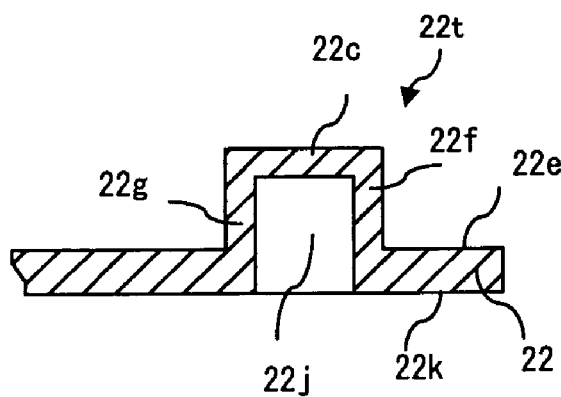

The structure of the face-down terminal solid electrolytic capacitor obtained according to this invention is as described above. Now, description will be made about a lead frame of this invention for use in manufacturing the capacitor. FIG. 2A is a plan view of the lead frame in this embodiment and FIG. 2B is a front view as seen in a direction C—C from the plane perpendicular to the sheet surface in FIG. 2A. FIGS. 3A to 3E show an anode terminal forming portion, wherein FIG. 3A is a plan view, FIG. 3B is a front view, FIG. 3C is a side view, FIG. 3D is a sectional view, and FIG. 3E is a perspective view. FIGS. 4A to 4E show a cathode terminal forming portion, wherein FIG. 4A is a plan view, FIG. 4B is a front view, FIG. 4C is a side view, and FIG. 4D is a sectional view.

Referring to FIGS. 2A to 4D, a lead frame 200 is formed with a plurality of anode terminal forming portions 21 and cathode terminal forming portions 22. Each anode terminal forming portion 21 has a staircase portion, stair-shaped portion, stair-like portion, or a convex portion 21t comprising a lower-stair portion 21e having a flat surface 21k on its lower side serving as a mount surface to be mounted on a board and a flat surface on its upper side, an upper-stair portion 21c which is flat and parallel to the bottom surface 21k serving as the mount surface onto the board, an inclined portion 21b continuous with the upper-stair portion 21c, and rising portions 21f, 21g, 21h, and 21n extending substantially perpendicularly from the lower-stair portion 21e to the upper-stair portion. On both lateral sides of the staircase portion near the upper-stair portion are provided projecting portions 21a projecting laterally. Further, the anode terminal forming portion 21 is formed with a hollow portion, a cavity portion, or a concave portion 21j extending from the bottom toward the upper-stair portion. The cavity portion 21j has inner walls that are substantially perpendicular to the bottom surface 21k, but it is not necessary that all the inner wall surfaces be substantially parallel to the outer surfaces of the rising portions. It is desirable that the inner wall of the rising portion 21f be substantially perpendicular to the bottom surface 21k. The flat upper-stair portion is a portion that will serve as a connection margin where the anode lead of the capacitor element is welded by resistance welding or laser welding and has a length necessary for realizing secure welding with a limited area. If it is too long, unevenness or nonuniformity occurs at a welded position. The inclined portion 21b has a function of limiting the length of the upper-stair portion 21c. Since the projection portions are provided, the width of the upper-stair portion is greater than an interval between side surfaces of the rising portions 21h and 21n. The shape of the anode terminal forming portion can be formed by drawing or crushing a metal flat base plate of the lead frame. The projecting portions 21a of the anode terminal forming portion 21 serve to provide the anchor effect for preventing the anode terminal from coming off the casing resin when cutting out a capacitor after attaching the capacitor element to the lead frame and overmolding them with the casing resin or when mounting the cut-out capacitor onto the board.

Referring to FIGS. 2A to 4D again, each cathode terminal forming portion 22 has a staircase portion, stair-shaped portion, stair-like portion, or a convex portion 21t comprising a lower-stair portion 21e which is flat and parallel to a bottom surface 22k on the board mount side, a flat upper-stair portion 22c, and rising portions 22f, 22g, 22h, and 22n extending perpendicularly from the lower-stair portion 21e to the upper-stair portion. On both lateral sides of the staircase portion near the upper-stair portion are provided projecting portions 22a projecting laterally. Further, the cathode terminal forming portion 22 is formed with a hollow portion, a cavity portion, or a concave portion 22j extending from the bottom surface 22k toward the upper-stair portion. The cavity portion 22j has solid inner walls that are substantially perpendicular to the bottom surface. It is not necessary that all the inner surfaces be perpendicular to the bottom surface, but it is desirable that the inner wall of the rising portion 22f be perpendicular to the bottom surface. In the case of the former, a section parallel to the upper-stair portion becomes rectangular. The width of part of the upper-stair portion where the projecting portions are located is greater than an interval between side surfaces of the rising portions 22h and 22n. The shape of the cathode terminal forming portion can be formed by drawing or crushing the metal flat base plate of the lead frame. The projecting portions 22a of the cathode terminal forming portion serve to provide the anchor effect for preventing the cathode terminal from coming off the casing resin when cutting out the capacitor after attaching the capacitor element to the lead frame and overmolding them with the casing resin or when mounting the cut-out capacitor onto the board.

Plating is applied to the whole surfaces of the lead frame or at least the inner walls of the cavity portions 21j and 22j of the anode and cathode terminal forming portions 21 and 22. Specifically, as this plating film, a metal plating film containing at least one of Ag, Au, Cu, Pd, and Sn is formed by a known method. Through this plating film, a bonding force is increased at an interface with a solder or a conductive adhesive. The plating film of the lead frame may be formed before the processing to form the shapes of the anode and cathode terminal forming portions.

Figure 5:
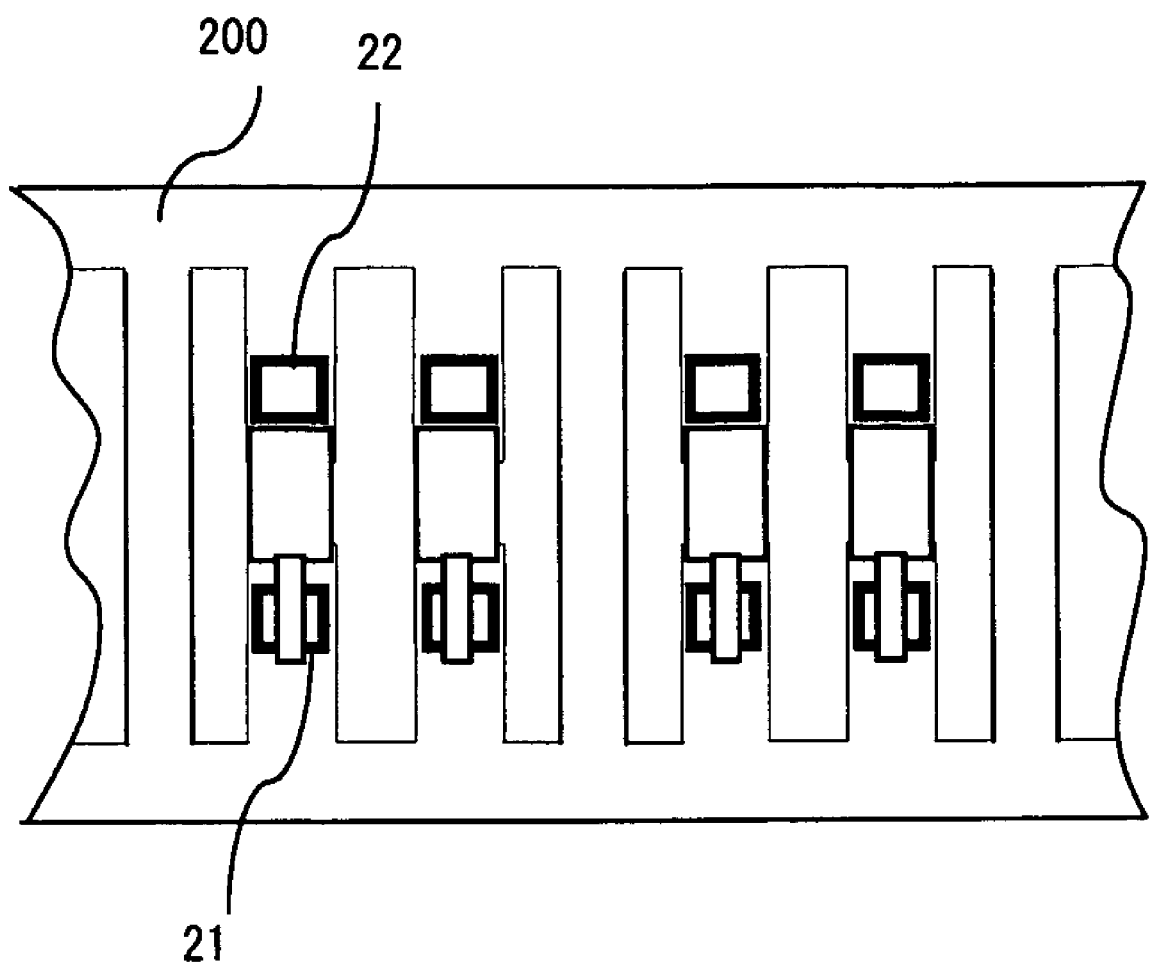
FIG. 5 is a plan view relating to part of manufacturing processes according to this invention and showing the state where capacitor elements are disposed and joined to the lead frame.

FIG. 5 is a plan view showing the state where the capacitor elements are disposed and joined to the lead frame produced as described above. In the figure, the capacitor elements are disposed at respective sections of the lead frame 200. Before attaching the capacitor elements to the lead frame, an insulating resin is disposed at the lower-stair portion of each anode terminal forming portion 21 to thereby provide insulation from a cathode layer of the capacitor element while a conductive adhesive is disposed at the lower-stair portion of each cathode terminal forming portion 22 for bonding to the cathode layer of the capacitor element to thereby provide electrical connection therebetween. Then, the anode lead of each capacitor element is fixedly welded to the upper-stair portion of the anode terminal forming portion. In this state, the lead frame and the capacitor elements are overmolded with the casing resin.

Figure 6:
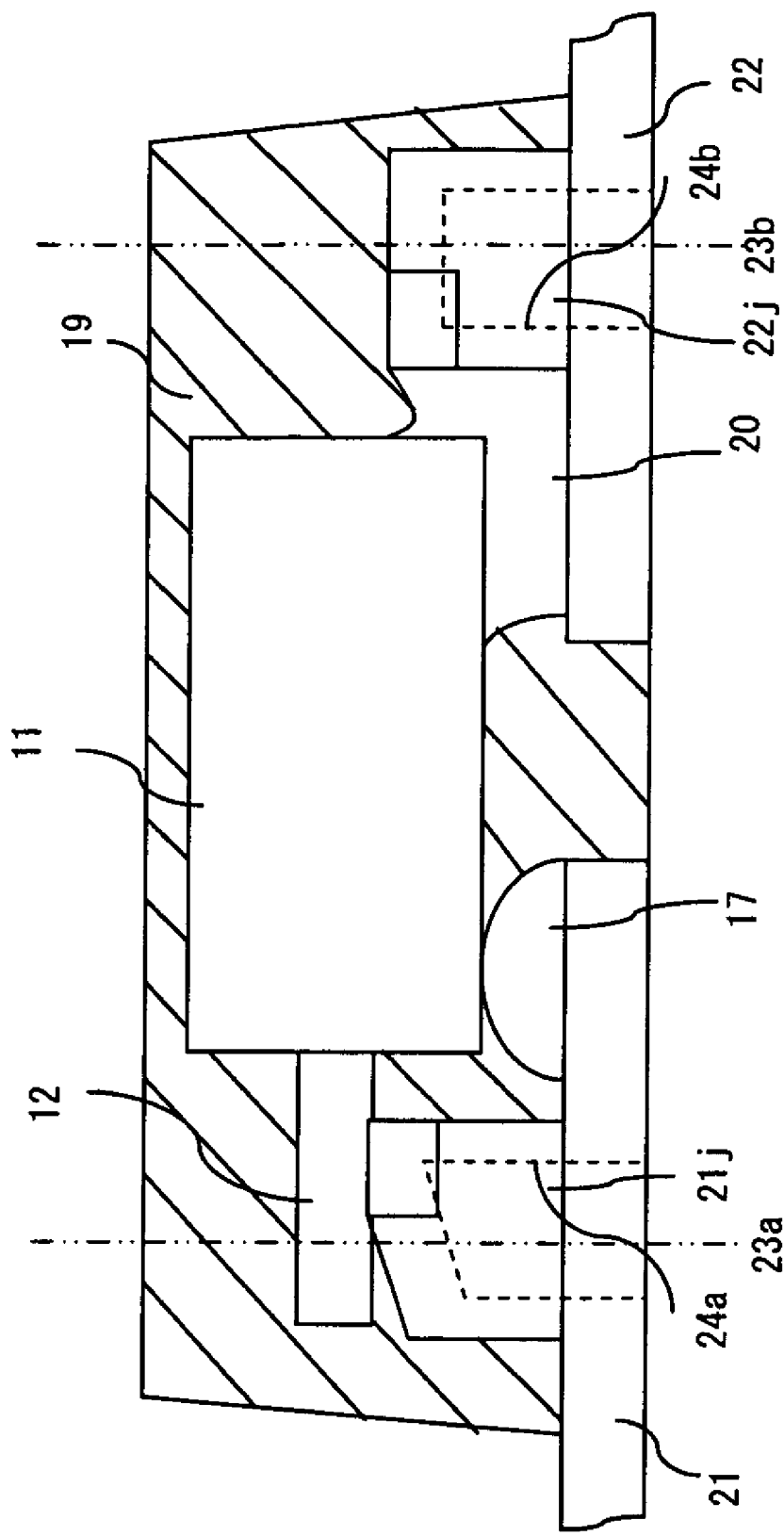
FIG. 6 is a front view relating to part of the manufacturing processes according to this invention and showing the state where the lead frame and the single capacitor element are overmolded with a casing resin.

FIG. 6 shows the state where the lead frame and the single capacitor element are thus overmolded with the casing resin. FIG. 6 is a front view showing the state where part of the casing resin is removed in the plane passing through the center of the capacitor element and perpendicular to the bottom surface that will serve as the mount surface, wherein the casing resin is shown by hatching and the inside of the anode and cathode terminal forming portions is shown by dotted lines.

In FIG. 6, the insulating resin 17 is disposed at the lower-stair portion of the anode terminal forming portion 21 for achieving insulation from the cathode layer of the capacitor element 11 while the conductive adhesive 20 is disposed at the lower-stair portion of the cathode terminal forming portion 22 for establishing electrical connection with the cathode layer of the capacitor element. By cutting, in this state, the casing resin 19, the lead frame, etc. along the cutting planes 23a and 23b perpendicular to the bottom surface that will serve as the mount surface, the cavity portions 21j and 22j are each divided into two parts so that the fillet surfaces 15a and 15b (see FIGS. 1A to 1C) applied with the plating are exposed. Preferably, each fillet surface has a flat surface recessed from the cutting plane, which is substantially perpendicular to the bottom surface.

In the lead frame of this invention, since the plated hollow portion of each of the anode and cathode terminal forming portions communicates with the exterior of the staircase portion only from the bottom, it is possible to prevent invasion of the casing resin into the hollow portion at the time of the overmolding. Therefore, the plated surfaces of the inner walls of the hollow portions, which are exposed when the lead frame overmolded along with the capacitor element is cut through the hollow portions, can be ensured as solder wet-up surfaces which are necessary at the time of mounting onto the board.

Figure 7:
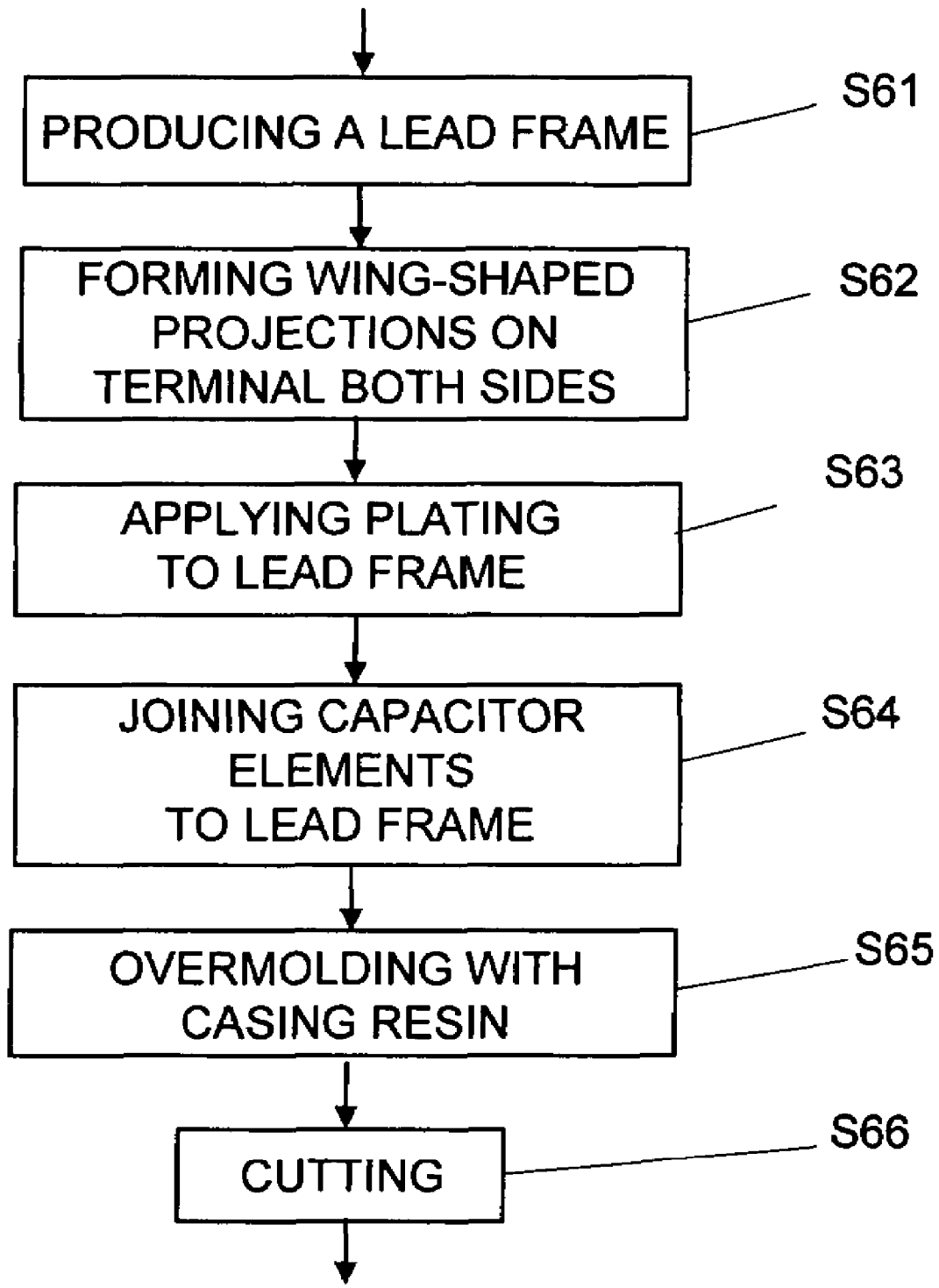
FIG. 7 is a flow diagram showing the manufacturing processes according to this invention.

Referring now to FIG. 7, description will be made about the method of manufacturing the solid electrolytic capacitor with face-down terminals. S61 is a process of applying a drawing or crushing process to a flat-shaped lead frame to form the anode and cathode terminal forming portions each having the hollow portion, the cavity portion, or the concave portion. S62 is a process of forming the wing-shaped projections at the upper-stair portion of each of the anode and cathode terminal forming portions and an inclination process of forming the inclined surface continuous with the upper-stair portion on the upper side of the convex portion of each anode terminal forming portion. The projections are formed by shaving side walls of a member formed by drawing or crushing and having a cavity inside and a convex shape outside. In the case of the anode terminal forming portion, the inclination process is carried out by crushing in the process S62. S63 is a plating process. In the case of the drawing process, the formation of the concave portion or the hollow portion may be performed in the process S61 or S62 after applying plating to the flat-shaped lead frame. Then, S64 is a process of fixedly joining the capacitor elements to the lead frame, S65 is a casing resin overmolding process, and S66 is a process of cutting the lead frame and the casing resin. Through these processes, the face-down-terminal structured solid electrolytic capacitor of this embodiment is obtained.

EXAMPLE 1

Now, this invention will be described in detail by the use of an example. A capacitor element is produced by a known technique. Description will be made about a case where tantalum is used as a valve-action metal. First, tantalum metal powder is formed into a compact by a press machine while a tantalum lead wire is embedded in the compact. The compact is then sintered in a high vacuum at a high temperature. Then, a $Ta_2O_5$ film is formed on the surface of the sintered compact. After immersed in a manganese nitrate solution, the compact with the $Ta_2O_5$ film is subjected to thermal decomposition to form $MnO_2$. Subsequently, a cathode layer is formed by graphite and Ag to obtain a capacitor element. If use is made of a conductive high polymer such as polythiophene or polypyrrole instead of $MnO_2$, there is an effect for reducing an ESR (equivalent series resistance). Further, use may be made of niobium, aluminum, titanium, or the like as a valve-action metal instead of tantalum.

Now, description will be made about a method of producing anode and cathode terminal forming portions of a lead frame. As a lead frame of the first example, a flat-plate lead frame as shown in FIG. 2A is first produced. Then, with respect to each of anode and cathode terminal forming portions 21 and 22, a concave or hollow portion is formed from the lower side of the sheet surface so that a convex portion is formed on the upper side of the sheet surface. These cavity portions will be described with reference to FIGS. 3A to 3E and 4A to 4D. The hollow portion or the cavity portion 21j of the anode terminal forming portion has a shape such that four inner surfaces form walls rising substantially perpendicularly from a bottom surface 21k and the inner ceiling is formed by an inclined surface and a flat surface following the inclined surface. Further, outer and inner walls of a rising portion extending substantially perpendicularly from the lower-stair portion on the side of the anode terminal forming portion 21 where the capacitor element is disposed are substantially parallel to each other. On the other hand, the hollow portion or the cavity portion 22j of the cathode terminal forming portion has a rectangular parallelepiped shape such that four inner surfaces form walls rising perpendicularly from the bottom surface and the inner ceiling is a flat surface. Further, outer and inner walls of a rising portion extending perpendicularly from the lower-stair portion on the side of the cathode terminal forming portion 22 where the capacitor element is disposed are substantially parallel to each other. These shapes of the anode and cathode terminal forming portions are formed by applying drawing to the flat-plate lead frame. Plating to the inner surfaces of the hollow or cavity portions is as described before.

Formation of projecting portions at the convex portions of the anode and cathode terminal forming portions is implemented by shaving the outer surfaces of the convex portions. By the shaving, wing-shaped projecting portions 21a (or 22a) for obtaining the anchor effect with the casing resin are formed in the upper parts of side surfaces of rising portions 21h and 21n (or 22h and 22n) so as to extend perpendicularly from the side surfaces. After an insulating resin 17 is applied to an anode terminal portion close to a cathode layer of the capacitor element for ensuring insulation, connection with an anode lead is carried out by laser welding or resistance welding. With respect to the cathode side, connection is carried out by the use of a conductive adhesive 20 containing Ag. Then, after overmolding the casing resin by transfer mold, the overmolded composite is cut at two surfaces, which will serve as side surfaces of a product, by the use of a dicing saw, thereby obtaining a face-down terminal solid electrolytic capacitor. In this event, the cutting is performed so that the cut surfaces become parallel to the inner walls of the rising portions perpendicular to the axis of the capacitor element. In this manner, it is possible to manufacture the face-down terminal solid electrolytic capacitor having the stable electrode terminals and excellent in productivity.

EXAMPLE 2

Figure 8:
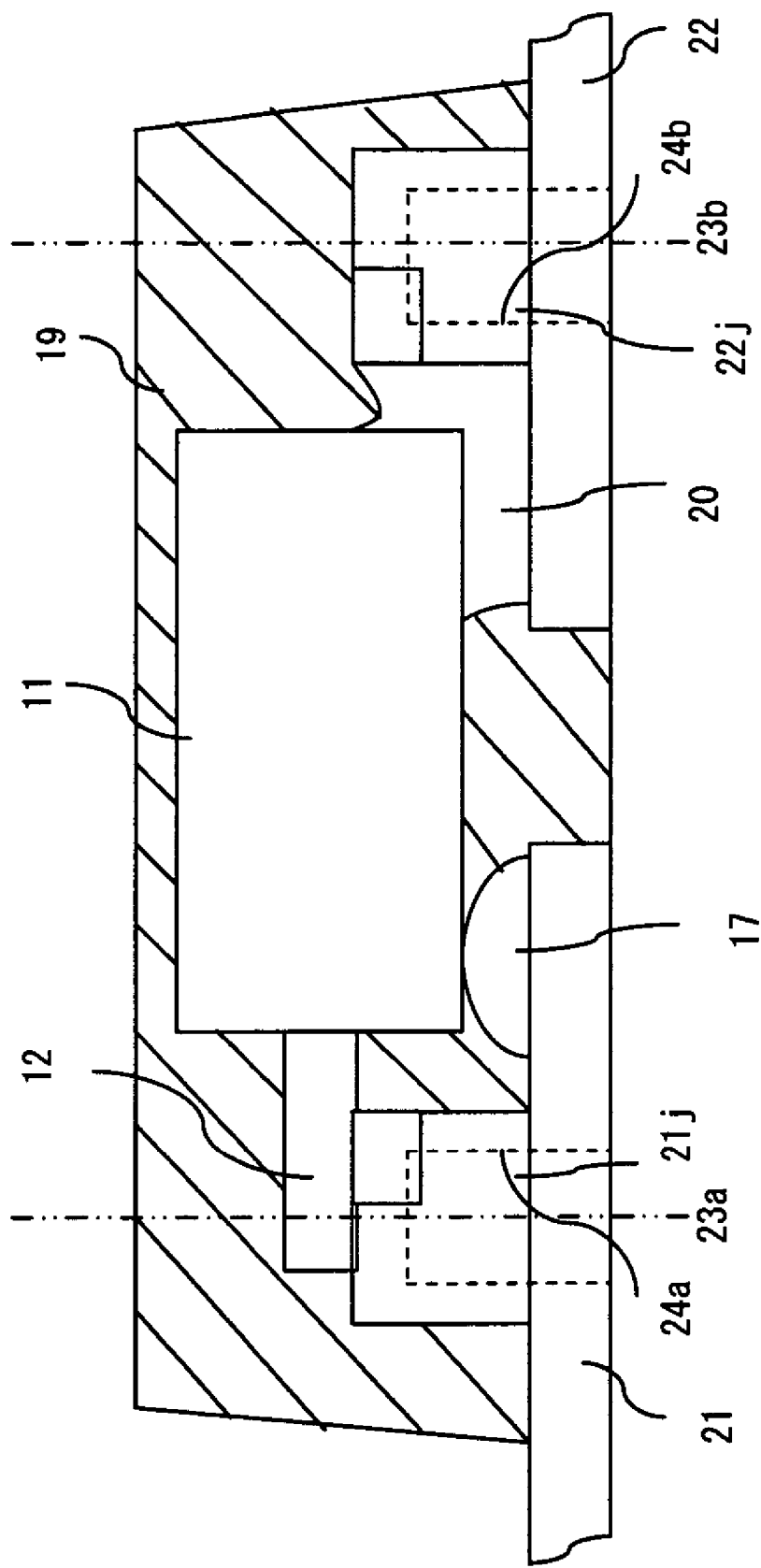
FIG. 8 is a front view relating to a second example of this invention and showing the state where a lead frame and a single capacitor element are overmolded with a casing resin.

FIG. 8 is a front view relating to a second example and showing the state where a lead frame and a single capacitor element are overmolded with a casing resin, wherein part of the casing resin is removed in the plane passing through the center of the capacitor element and perpendicular to the bottom surface that will serve as a mount surface and wherein the casing resin is shown by hatching and the inside of anode and cathode terminal forming portions is shown by dotted lines.

In this example, an anode terminal forming portion 21 and a cathode terminal forming portion 22 have the same shape. That is, the cathode terminal forming portion 22 used in the first example is also used as the anode terminal forming portion 21. Therefore, the one having the shape as shown in FIGS. 4A to 4D also forms the anode terminal forming portion. Since the other structure is the same as that in the first example, explanation thereof is omitted.

EXAMPLE 3

Figure 9A:
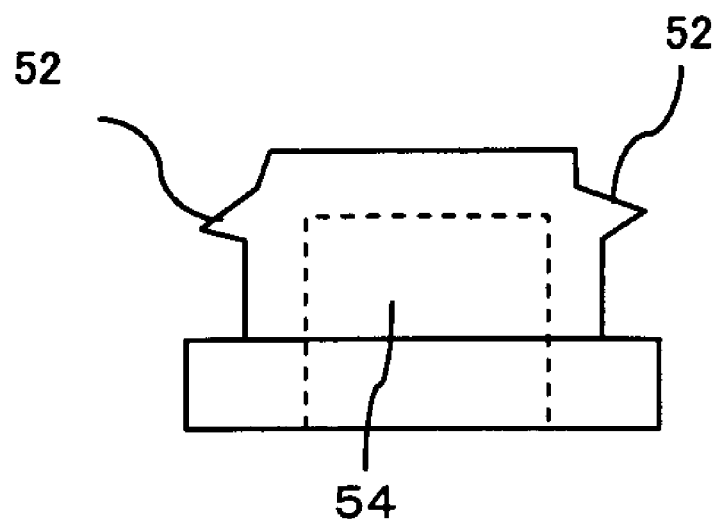
FIGS. 9A and 9B are side views respectively showing terminal forming portions used in third and fourth examples of this invention.

FIG. 9A relates to a third example and shows the shape of a concave-convex portion for a lead frame terminal forming portion. The other structure is the same as that in the first example. The shape of a hollow portion or a cavity portion 54 and plating thereto are also the same as those in the first example. In this example, the external shape of the terminal forming portion is such that triangular projecting portions 52 are formed in the upper parts of side surfaces of two rising portions which are in a positional relationship parallel to a disposition direction of a capacitor element, wherein the triangular projecting portions 52 are formed by shaving the corners so as to be wing-shaped extending perpendicularly from the side surfaces. By the use of the projecting portions 52, it is possible to obtain the anchor effect with the casing resin, thereby manufacturing a solid electrolytic capacitor having stable face-down terminals free of coming-off.

EXAMPLE 4

Figure 9B:
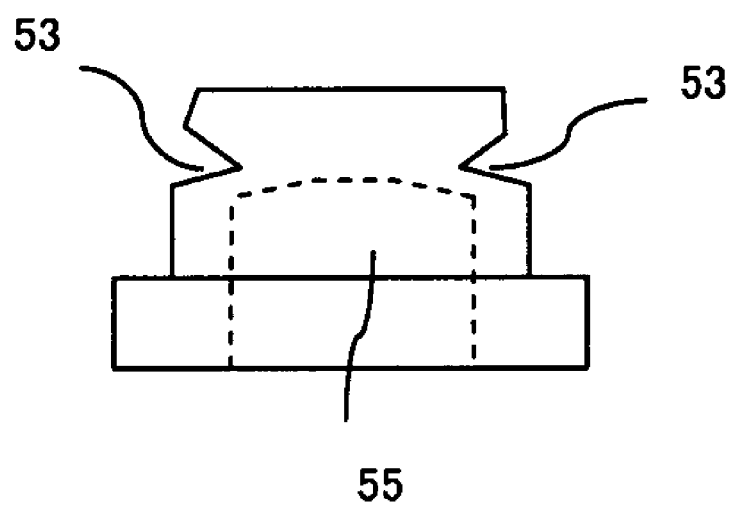
Figure 10A:
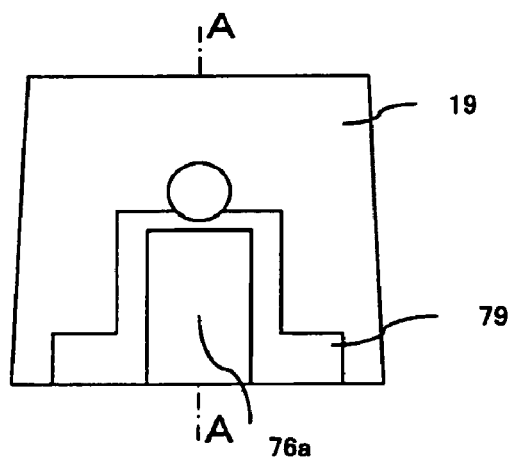
Figure 10B:
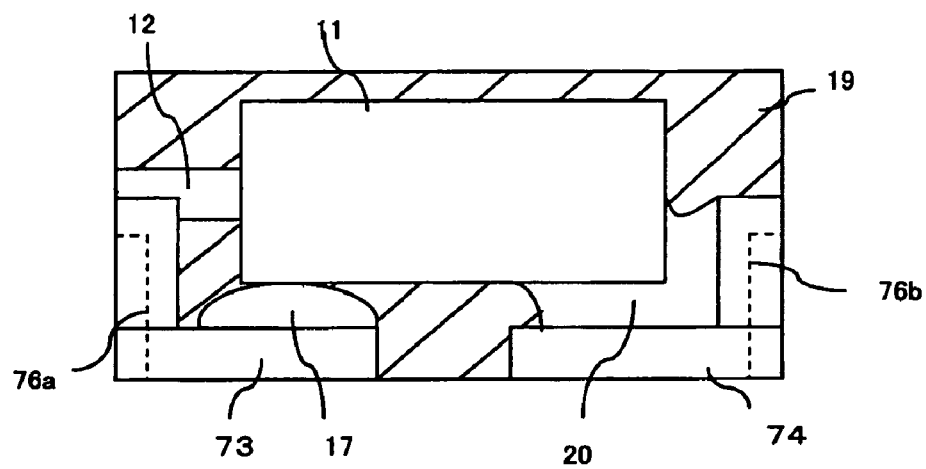
Figure 10C:
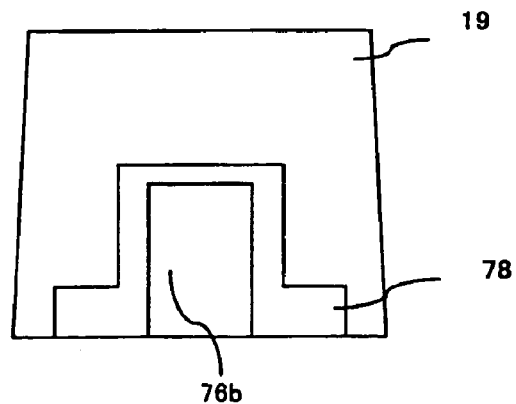
Figure 11:
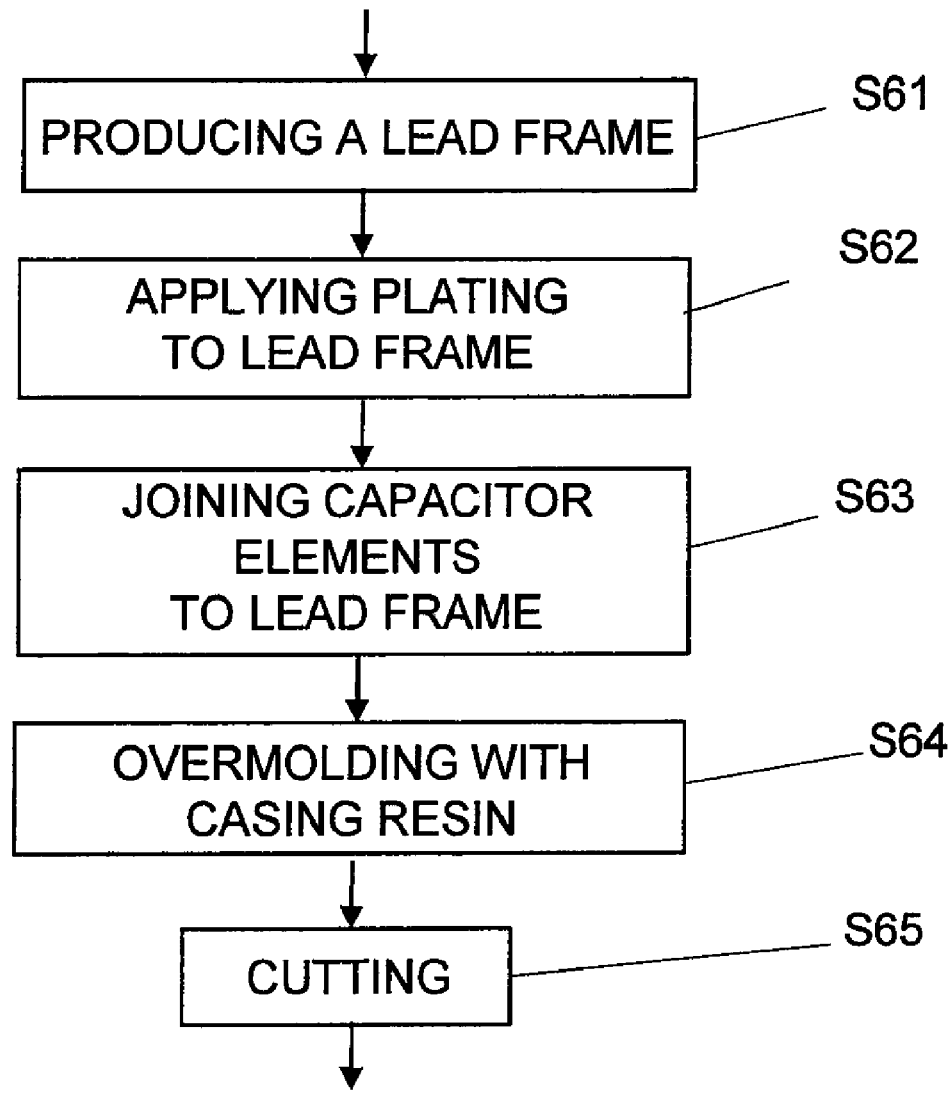
FIG. 11 is a flow diagram showing manufacturing processes of the capacitor shown in FIGS. 10A–10C.
Figure 12:
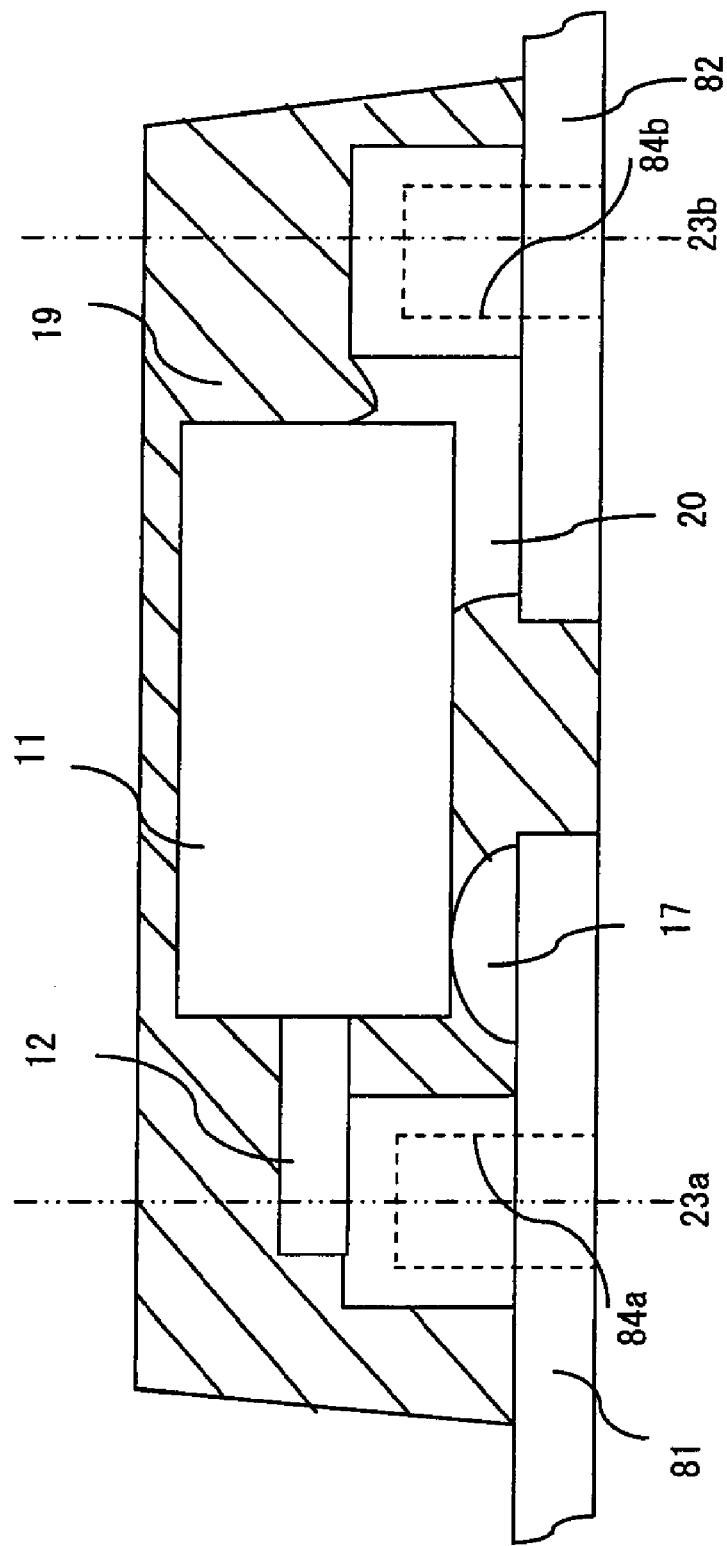
FIG. 12 is a front view showing the state where part of the casing resin is removed after joining a capacitor element to a lead frame and overmolding them with the casing resin in the manufacturing processes shown in FIG. 11.

In a fourth example, a cut-out shape as shown in FIG. 9B is used as a concave-convex portion for a lead frame terminal forming portion. The other structure is the same as that in the first example. A hollow portion or a cavity portion 55 is substantially the same as that in the first example except that the ceiling thereof has a round shape. Plating to the cavity portion is also the same as that in the first example. Triangular cut-out portions 53 are formed in the upper parts of side surfaces of two rising portions which are in a positional relationship parallel to an axial direction of a capacitor element, so as to extend perpendicularly from the side surfaces. By the use of the cut-out portions 53, it is possible to obtain the anchor effect with the casing resin, thereby manufacturing a solid electrolytic capacitor having stable face-down terminals free of coming-off.

As described above, the concave-convex shapes of the terminal forming portions differ in the first to fourth examples. It is preferable to use the proper shape or shapes according to the elastic and plastic properties of a lead frame alloy, the thickness of a lead frame, and so on. It is sufficient that one of the inner walls of the hollow or cavity portion of the terminal forming portion has a flat surface substantially perpendicular to the board mount surface. Then, by cutting the combined structure of the lead frame and the capacitor elements overmolded with the casing resin, along the cutting planes passing through the hollow portions and substantially perpendicular to the board mount surface, there is obtained the face-down terminal solid electrolytic capacitor having the plated fillet surfaces and the anode and cathode terminals applied with the coming-off preventing shapes.

While this invention has been described in terms of the embodiment, this invention is not to be limited thereto. Even if there is a design change in the range without departing from the gist of this invention, it is also included in this invention. That is, this invention naturally includes various changes and modifications that can be done by a person skilled in the art.

What is claimed is:

1. A solid electrolytic capacitor with face-down terminals, comprising:
   a capacitor element including a dielectric, an electrolyte, and a cathode layer formed in order on a surface of a porous sintered body made of a valve-action metal and having an anode lead drawn out therefrom;
   an anode terminal having one end connected to said anode lead and another end serving as an external connection terminal;
   a cathode terminal disposed so as to face said anode terminal and having one end electrically connected to said cathode layer of said capacitor element and another end serving as an external connection terminal; and
   a casing resin which covers said capacitor element, such that said anode terminal has, as exposed surfaces, a mount surface for mounting onto a board and a first external end surface substantially perpendicular to said mount surface, and such that said cathode terminal has, as exposed surfaces, a mount surface for mounting onto the board and a second external end surface substantially perpendicular to said mount surface;
   wherein said anode terminal comprises:
     an exposed surface recessed from said first external end surface and having plating applied thereto;
     a stair-shaped portion, which includes an upper-stair portion connected to said anode lead and formed on a side of the anode terminal where said capacitor element is located, opposite to a side of said first external end surface, and which includes a lower-stair portion having said mount surface as a bottom surface thereof; and
     an engaging portion which is formed at a side wall of said stair-shaped portion for engagement with said casing resin, and which comprises one of a projecting portion and a cut-out portion.

2. A solid electrolytic capacitor with face-down terminals according to claim 1, wherein said one of the projecting portion and the cut-out portion of said anode terminal is formed in a vicinity of said upper-stair portion of said stair-shaped portion.

3. A solid electrolytic capacitor with face-down terminals according to claim 1, wherein said recessed surface of said anode terminal comprises a surface substantially parallel to said first external end surface.

4. A solid electrolytic capacitor with face-down terminals according to claim 1, wherein said first external end surface of said anode terminal has a generally [-shape.

5. A solid electrolytic capacitor with face-down terminals according to claim 1, wherein said stair-shaped portion of said anode terminal is formed by one of a drawing process and a crushing process.

6. A solid electrolytic capacitor with face-down terminals according to claim 1, wherein a length of said upper-stair portion of said stair-shaped portion does not exceed a length necessary for performing excellent welding connection with said anode lead.

7. A solid electrolytic capacitor with face-down terminals according to claim 1, wherein said mount surface of said anode terminal has plating applied thereto.

8. A solid electrolytic capacitor with face-down terminals according to claim 7, wherein the plating of said recessed surface and said mount surface of said anode terminal is formed by a film containing at least one of Ag, Au, Cu, Pd, and Sn.

9. A solid electrolytic capacitor with face-down terminals according to claim 1, wherein a difference in level between said upper-stair portion and said lower-stair portion of said anode terminal is greater than a minimum distance between said cathode layer, on a mount surface side, of said capacitor element and an outer periphery of said anode lead.

10. A solid electrolytic capacitor with face-down terminals according to claim 1, wherein said cathode layer and said cathode terminal are connected to each other by a conductive adhesive containing Ag.

11. A lead frame for use in solid electrolytic capacitor face-down terminal formation, said lead frame having an anode terminal forming portion and a cathode terminal forming portion disposed so as to face each other, wherein said anode terminal forming portion comprises:
 a stair-shaped portion including an upper-stair portion and a lower-stair portion;
 a hollow portion formed in said stair-shaped portion, having an inner wall substantially perpendicular to a bottom surface adapted to serve as a mount surface of the anode terminal, extending toward said upper-stair portion, and having plating applied thereto; and
 one of a projecting portion and a cut-out portion formed at a side wall of said stair-shaped portion in a vicinity of said upper-stair portion.

12. A lead frame according to claim 11, wherein said cathode terminal forming portion comprises:
 a stair-shaped portion including an upper-stair portion and a lower-stair portion;
 a hollow portion formed in said stair-shaped portion, having an inner wall substantially perpendicular to a bottom surface adapted to serve as a mount surface of the cathode terminal, extending toward said upper-stair portion, and having plating applied thereto; and
 one of a projecting portion and a cut-out portion formed at a side wall of said stair-shaped portion in a vicinity of said upper-stair portion.

13. A lead frame according to claim 12, wherein each said anode terminal forming portion is arranged in a pair with one said cathode terminal forming portions.

14. A lead frame according to claim 11, wherein said anode terminal forming portion includes an inclined portion which is continuous with said upper-stair portion of said stair-shaped portion, and which approaches said mount surface as the inclined portion extends away from said upper-stair portion.

15. A lead frame according to claim 11, wherein at least one of said anode terminal forming portion and said cathode terminal forming portion is formed by applying a drawing process to a thin plate made of a metal or an alloy thereof.

16. A face-down terminal solid electrolytic capacitor manufacturing method comprising:
 placing, on the lead frame according to claim 11, a capacitor element including a dielectric, an electrolyte, and a cathode layer formed in order on a surface of a porous sintered body made of a valve-action metal and having an anode lead drawn out therefrom, and joining said anode lead to said upper-stair portion of said anode terminal forming portion;
 overmolding said capacitor element and said lead frame with a casing resin;
 cutting said casing resin, said anode terminal forming portion, and said anode lead so as to cross said hollow portion substantially perpendicularly to the bottom surface of said anode terminal forming portion to thereby form a first end surface adapted to serve as part of an external surface of the face-down terminal solid electrolytic capacitor and to thereby expose part of a wall surface of said hollow portion recessed from said first end surface; and
 cutting said casing resin and said cathode terminal forming portion so as to cross said hollow portion substantially perpendicularly to the bottom surface of said cathode terminal forming portion to thereby form a second end surface adapted to serve as part of the external surface of the face-down terminal solid electrolytic capacitor and to thereby expose part of a wall surface of said hollow portion recessed from said second end surface.

17. A face-down terminal solid electrolytic capacitor manufacturing method according to claim 16, further comprising applying an insulating resin to said lower-stair portion of said anode terminal forming portion before joining said anode lead of said capacitor element to said upper-stair portion of said anode terminal forming portion.

18. A lead frame for terminal formation used in manufacturing a face-down terminal solid electrolytic capacitor, wherein the solid electrolytic capacitor comprises: (i) a capacitor element including a dielectric, an electrolyte, and a cathode layer formed in order on a surface of a porous sintered body made of a valve-action metal and having an anode lead drawn out therefrom, (ii) an anode terminal having one end connected to said anode lead and another end serving as an external connection terminal, (iii) a cathode terminal having one end connected to said cathode layer of said capacitor element and another end serving as an external connection terminal, and (iv) an insulating casing resin which covers said capacitor element such that each of said anode terminal and said cathode terminal has, as exposed surfaces, a mount surface for mounting onto a board and an outer surface substantially perpendicular to said mount surface,
 wherein the lead frame comprises an anode terminal forming portion to serve as said anode terminal and a cathode terminal forming portion to serve as said cathode terminal, which are provided so as to face each other;

wherein said anode terminal forming portion has a concave-convex portion formed by deforming part of said anode terminal forming portion in a direction perpendicular to said mount surface, said concave-convex portion serving as a concave portion on a mount surface side and as a convex portion on a side opposite to said mount surface side;

wherein said concave portion has plating applied thereto; and wherein said convex portion comprises a flat portion which is parallel to said mount surface and is adapted to serve as a welding margin, and an inclined portion continuous with said flat portion and inclined so as to approach said mount surface as the inclined portion extends away from said flat portion.

19. A lead frame according to claim 18, wherein said concave-convex portion is formed by a drawing process.

20. A lead frame according to claim 18, wherein one of a projecting portion and a cut-out portion is provided at a surface of said convex portion substantially perpendicular to said mount surface, and said one of the projecting portion and said cut-out portion extends in a direction parallel to said mount surface and is located at a position away from said mount surface.

21. A face-down terminal solid electrolytic capacitor manufacturing method comprising:
joining the capacitor element to the lead frame according to claim 18;
overmolding said capacitor element and said lead frame with the casing resin; and
cutting said lead frame, said anode lead, and said casing resin along one of plated surfaces of said concave portion while leaving said one of plated surfaces, thereby forming an outer surface adapted to serve as a side surface of a product.

22. A solid electrolytic capacitor with face-down terminals, comprising:
a capacitor element including a dielectric, an electrolyte, and a cathode layer formed in order on a surface of a porous sintered body made of a valve-action metal and having an anode lead drawn out therefrom;
an anode terminal having one end connected to said anode lead and another end serving as an external connection terminal;
a cathode terminal having one end connected to said cathode layer of said capacitor element and another end serving as an external connection terminal; and
an insulating casing resin which covers said capacitor element such that each of said anode terminal and said cathode terminal has, as exposed surfaces, a mount surface for mounting onto a board and an outer surface substantially perpendicular to said mount surface;
wherein said anode terminal is exposed at part of each of, among outer surfaces of a product, said mount surface and a first side surface on an anode lead side and has an exposed surface that is continuous across a boundary between said mount surface and said first side surface;
wherein said anode terminal has a two-stair shape formed by one of a drawing process and a crushing process in said casing resin;
wherein a difference in level of said two-stair shape is greater than a minimum distance between said cathode layer, on a mount surface side, and an outer periphery of said anode lead;
wherein said first side surface comprises a cut surface and a plated surface formed at part of said anode terminal;
wherein a cut-surface shape of said anode terminal at said cut surface is a generally [-shape; and
wherein said anode terminal comprises one of a projecting portion and a cut-out portion extending in a direction parallel to said mount surface and located at a position away from said mount surface.

23. A solid electrolytic capacitor with face-down terminals according to claim 22, wherein said cathode terminal is exposed at part of each of, among the outer surfaces of the product, said mount surface and a second side surface on a side opposite to said anode lead side and has an exposed surface that is continuous across a boundary between said mount surface and said second side surface;
wherein said cathode terminal has a two-stair shape formed by one of a drawing process and a crushing process in said casing resin;
wherein a difference in level of said two-stair shape is greater than the minimum distance between said cathode layer, on the mount surface side, and the outer periphery of said anode lead;
wherein said second side surface comprises a cut surface and a plated surface formed at part of said cathode terminal;
wherein a cut-surface shape of said cathode terminal at said cut surface is a generally [-shape; and
wherein said cathode terminal comprises one of a projecting portion and a cut-out portion extending in a direction parallel to said mount surface and located at a position away from said mount surface.

24. A solid electrolytic capacitor with face-down terminals, comprising:
a capacitor element including a dielectric, an electrolyte, and a cathode layer formed in order on a surface of a porous sintered body made of a valve-action metal and having an anode lead drawn out therefrom;
an anode terminal having one end connected to said anode lead and another end serving as an external connection terminal;
a cathode terminal disposed so as to face said anode terminal and having one end electrically connected to said cathode layer of said capacitor element and another end serving as an external connection terminal; and
a casing resin which covers said capacitor element, such that said anode terminal has, as exposed surfaces, a mount surface for mounting onto a board and a first external end surface substantially perpendicular to said mount surface, and such that said cathode terminal has, as exposed surfaces, a mount surface for mounting onto the board and a second external end surface substantially perpendicular to said mount surface;
wherein said anode terminal comprises:
an exposed surface recessed from said first external end surface and having plating applied thereto;
a stair-shaped portion, which includes an upper-stair portion connected to said anode lead and formed on a side of the anode terminal where said capacitor element is located, opposite to a side of said first external end surface, and which includes a lower-stair portion having said mount surface as a bottom surface thereof;
an engaging portion which is formed at a side wall of said stair-shaped portion for engagement with said casing resin; and an inclined portion continuous with said upper-stair portion of said stair-shaped portion and approaching said mount surface the inclined portion extends away from said upper-stair portion.

25. A solid electrolytic capacitor with face-down terminals, comprising:

a capacitor element including a dielectric, an electrolyte, and a cathode layer formed in order on a surface of a porous sintered body made of a valve-action metal and having an anode lead drawn out therefrom;

an anode terminal having one end connected to said anode lead and another end serving as an external connection terminal;

a cathode terminal disposed so as to face said anode terminal and having one end electrically connected to said cathode layer of said capacitor element and another end serving as an external connection terminal; and a casing resin which covers said capacitor element, such that said anode terminal has, as exposed surfaces, a mount surface for mounting onto a board and a first external end surface substantially perpendicular to said mount surface, and such that said cathode terminal has, as exposed surfaces, a mount surface for mounting onto the board and a second external end surface substantially perpendicular to said mount surface;

wherein said anode terminal comprises:

an exposed surface recessed from said first external end surface and having plating applied thereto;

a stair-shaped portion, which includes an upper-stair portion connected to said anode lead and formed on a side of the anode terminal where said capacitor element is located, opposite to a side of said first external end surface, and which includes a lower-stair portion having said mount surface as a bottom surface thereof; and an engaging portion which is formed at a side wall of said stair-shaped portion for engagement with said casing resin, and which comprises one of a projecting portion and a cut-out portion; and wherein said cathode terminal comprises:

an exposed surface recessed from said second external end surface and having plating applied thereto;

a stair-shaped portion, which includes an upper-stair portion formed on a side of the cathode terminal where said capacitor element is located, opposite to a side of said second external end surface, and which includes a lower-stair portion having said mount surface as a bottom surface thereof; and an engaging portion formed at a side wall of said stair-shaped portion for engagement with said casing resin.

26. A solid electrolytic capacitor with face-down terminals according to claim 25, wherein said recessed surface of said anode terminal comprises a surface substantially parallel to said second external end surface.

27. A solid electrolytic capacitor with face-down terminals according to claim 25, wherein said engaging portion of said cathode terminal comprises one of a projecting portion and a cut-out portion that is formed in a vicinity of said upper-stair portion of said stair-shaped portion.

28. A solid electrolytic capacitor with face-down terminals according to claim 25, wherein said second external end surface of said cathode terminal has a generally [-shape.

29. A solid electrolytic capacitor with face-down terminals according to claim 25, wherein said stair-shaped portion of said cathode terminal is formed by one of a drawing process and a crushing process.

* * * * *